(No Model.)
C. F. JESSER.
PORTABLE PASTRY RACK.
No. 481,404. Patented Aug. 23, 1892.
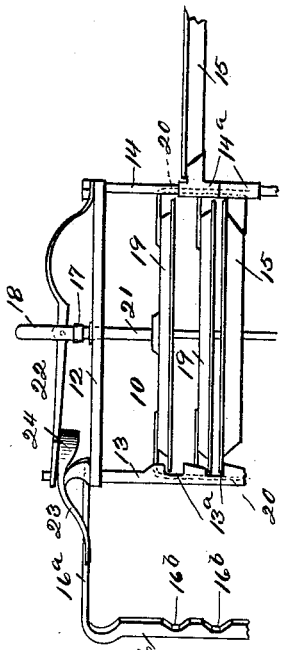
WITNESSES:
Fred J. Dieterich
Jos. A. Ryan
INVENTOR:
Charles F. Jesser
BY Munn & Co.
ATTORNEYS

UNITED STATES PATENT OFFICE.

CHARLES F. JESSER, OF STAUNTON, VIRGINIA.

PORTABLE PASTRY-RACK.

SPECIFICATION forming part of Letters Patent No. 481,404, dated August 23, 1892.

Application filed October 31, 1891. Serial No. 410,460. (No model.)

*To all whom it may concern:*

Be it known that I, CHARLES F. JESSER, residing at Staunton, Augusta county, and State of Virginia, have invented a new and useful Improvement in Portable Pastry-Racks, of which the following is a specification.

This invention relates to portable pastry-racks.

Great difficulty has been experienced in transporting great quantities of pastry; and it is the object of my invention to overcome this difficulty by providing a rack exceedingly durable in itself and in which the articles to be transported can be quickly arranged, securely locked against displacement, and sufficiently covered to protect them during transit.

A further object of my invention is to provide a rack which can also be utilized as a display-rack when so desired.

With these objects in view my invention consists, essentially, in a suitable supporting-frame, a series of laterally-movable receptacles pivoted to said frame and adapted to be swung without the same, and a series of vertically-movable covers adapted to cover the said receptacles.

My invention consists, further, in certain details of construction and combination of parts as will be fully described hereinafter, and pointed out in the claims.

In the drawings forming a part of this specification, Figure 1 is a side elevation of my improved rack. Fig. 2 is a detail view of the upper portion, the parts being locked. Fig. 3 is a similar view, the parts being unlocked; and Fig. 4 is a top plan view.

In carrying out my invention I employ a skeleton frame 10, composed of the base portion 11, the head portion 12, and the vertical rods or posts 13 and 14, connecting said head and base portions, the inner edges of the posts 13 being provided with a series of notches 13$^a$, in which the rims of the receptacles are adapted to rest, as hereinafter explained.

A series of pans or receptacles 15 are pivotally attached to the rod or post 14, said pans or receptacles having collars 14$^a$ formed thereon, which fit and turn upon the rod 14, and these collars rest one upon the other, as shown, and being of uniform length hold the pans or receptacles an equal distance apart. The pans 15 are adapted to receive pies or other pastry and can be swung outside the frame when it is desired to place the article therein or when it is desired to display the same.

When it is necessary to transport the article, the pans are swung into the frame and locked therein, the rims of the pans entering the notches 13$^a$ in the rods or posts 13, whereby the pans are held against vertical movement. In order to lock the pans within the frame, I provide a locking-bar 16, which is pivotally connected with the rod 13 opposite the rod or post 14 by means of the curved arm 16$^a$, the length and shape of said arms being such that when the bar 16 is swung around to contact with the rims of the pans it will be opposite the other bar 13. A catch 17 is arranged upon the head portion 12 and adapted to engage and hold the upper curved arm 16$^a$ when the locking-bar is brought in contact with the pans, and the inner edge of this bar 16 is also notched at 16$^b$ to receive the rims of the pans. A handle 18 is also secured to the head-section, by means of which the rack can be conveniently lifted and carried.

It has also been found desirable and necessary to cover the pastry in the pans or receptacles, and I therefore provide a series of covers 19, one for each pan, said covers being arranged within the frame, and all connected with one another by means of the rods 20, there being two such rods, and attached at opposite points, as clearly shown. The object of connecting the covers is to hold them in their respective places and also to raise them simultaneously, whereby the pans beneath the same can be readily swung outside the frame; and to raise the said covers I provide the upper cover with a central post 21, the upper end of said post being connected with a spring-bar 22, which extends diametrically across the head portion, one end of said bar being rigidly attached to the rod or post 14, while the opposite end of said bar is apertured and slides upon the extended end of the rod or post 13 opposite the rod or post 14. The normal position of the spring-bar is down, holding the covers down, and to raise the bar and likewise the covers I provide the upper curved arm 16$^a$ with a rearward extension 23, which extension is constructed to pass under the free end of said bar as the locking-bar is swung out of engagement with the pans, raising the said spring-bar, and to continue this raising motion the extension is provided with an inclined wing 24, which also passes under the bar 22, raising the same. From this it will be seen that as the locking-bar is thrown back in order to afford access to the pans the covers are simultaneously raised from their respective pans, allowing said pans to be swung outside the frame.

Having thus described my invention, what I claim, and desire to secure by Letters Patent, is—

1. The combination, with a skeleton frame, of a series of pans or receptables pivoted thereto and adapted to swing horizontally into and out of said frame and a locking-arm attached also to said frame to secure the pans therein, substantially as shown and described.

2. The combination, with a frame composed of a base, head, and vertical connections, of series of pans or receptacles hinged to one of said vertical connections and adapted to swing in and out of the frame and a locking-bar hinged to the opposite vertical connections, substantially as shown and described.

3. The combination, with the head and base portions, of the vertical connecting rod or bar, the pans or receptacles pivotally connected therewith, the notched vertical connecting rod or post, and the notched locking-bar and catch, all arranged substantially as shown and described.

4. The combination, with the head and base portions, of the rods or posts 13 and 14, the pans having collars arranged upon the rod or post 14, the notched locking-bar pivotally connected with the rod or post 13 opposite the rod or post 14, and the catch attached to the head portion and adapted to engage the locking-bar, substantially as shown and described.

5. The combination, with a skeleton frame, of a series of horizontally-movable pans or receptacles pivoted thereto and a series of vertically-movable covers arranged within the frame, one above each pan, and the rods connecting the said covers, whereby they are held in place and adapted to be moved simultaneously, substantially as shown and described.

6. The combination, with a skeleton frame, of the horizontally-movable pans pivoted thereto, the locking-bar, the vertically-movable covers, and connections between the locking-bar and covers, substantially as shown and described.

7. The combination, with the skeleton frame, of the horizontally-movable pans pivoted thereto, the vertically-movable covers arranged therein and connected with one another, the spring-bar to which the covers are connected, and the curved arm pivotally attached to the frame, arranged beneath the spring-bar, and adapted to raise the same, substantially as shown and described.

8. The combination, with a frame, of the horizontally-movable pans pivoted thereto, the series of vertically-movable covers arranged therein, one above each pan, the rods connecting the covers, the spring-bar attached to the frame, the connecting-post connecting the top cover and spring-bar, and the locking-bar pivoted to the frame and carrying a curved extension, which rests beneath the spring-bar, said extension being provided with an inclined wing, substantially as shown and described.

CHARLES F. JESSER.

Witnesses:
C. SHEETS.
JAS. E. TAYLOR.